United States Patent
Yoshio et al.

(10) Patent No.: US 8,560,551 B2
(45) Date of Patent: *Oct. 15, 2013

(54) IMAGE SEARCH APPARATUS AND IMAGE SEARCH METHOD

(75) Inventors: Hiroaki Yoshio, Kanagawa (JP); Shuji Inoue, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,380

(22) Filed: Feb. 20, 2012

(65) Prior Publication Data

US 2012/0150876 A1 Jun. 14, 2012

Related U.S. Application Data

(63) Continuation of application No. 12/064,928, filed as application No. PCT/JP2006/325646 on Dec. 22, 2006, now Pat. No. 8,150,854.

(30) Foreign Application Priority Data

Dec. 22, 2005 (JP) .................................. 2005-370613

(51) Int. Cl.
G06F 17/30 (2006.01)

(52) U.S. Cl.
USPC .......................................... 707/741; 382/118

(58) Field of Classification Search
None
See application file for complete search history.

(56) References Cited

U.S. PATENT DOCUMENTS

| | | | |
|---|---|---|---|
| 6,122,628 A * | 9/2000 | Castelli et al. ........................ | 1/1 |
| 6,163,628 A | 12/2000 | Ibenthal et al. | |
| 6,292,577 B1 | 9/2001 | Takahashi | |
| 6,741,985 B2 * | 5/2004 | Green .......................... | 707/742 |
| 7,054,468 B2 | 5/2006 | Yang | |
| 7,298,931 B2 | 11/2007 | Kim et al. | |
| 8,166,039 B1 * | 4/2012 | Haveliwala ................... | 707/741 |

(Continued)

FOREIGN PATENT DOCUMENTS

| JP | 01-103735 A | 4/1989 |
|---|---|---|
| JP | 04-370881 A | 12/1992 |

(Continued)

OTHER PUBLICATIONS

Hafner et al. Efficient Color Histogram Indexing for Quadratic Form Distance Functions published 1995 IEEE.*

(Continued)

*Primary Examiner* — Neveen Abel Jalil
*Assistant Examiner* — Kevin L Young
(74) *Attorney, Agent, or Firm* — Pearne & Gordon LLP

(57) ABSTRACT

An image search apparatus has: a dimension reducing unit for reducing dimensions of multidimensional feature data to be produced as approximate data; an approximate-data storing unit for storing the produced approximate data with corresponding to the multidimensional feature data before the dimension reduction; a search request receiving unit for receiving an identifier which identifies multidimensional feature data of a person to be searched, at least as a search key; an approximate-space searching unit for calculating distances between approximate data corresponding to the received search key, and plural approximate data stored in the approximate-data storing unit, and for arranging the distances in order of similarity; and a real-space final ranking unit for again performing a distance calculation with using the multidimensional feature data before the dimension reduction, on a group of results in which the similarity is high, and for determining final rankings.

20 Claims, 10 Drawing Sheets

(56) References Cited

U.S. PATENT DOCUMENTS

| | | |
|---|---|---|
| 2003/0086593 A1 | 5/2003 | Liu et al. |
| 2004/0073543 A1 | 4/2004 | Kim et al. |
| 2005/0216426 A1* | 9/2005 | Weston et al. ............ 706/12 |
| 2006/0251339 A1* | 11/2006 | Gokturk et al. ............ 382/305 |
| 2008/0205756 A1 | 8/2008 | Kamata et al. |

FOREIGN PATENT DOCUMENTS

| | | |
|---|---|---|
| JP | 10-049659 A | 2/1998 |
| JP | 10-240771 A | 9/1998 |
| JP | 10-326286 A | 12/1998 |
| JP | 2000-276484 A | 10/2000 |
| JP | 2002-183205 A | 6/2002 |
| JP | 2003-345830 A | 12/2003 |
| JP | 2004-133947 A | 4/2004 |
| JP | 2005-250562 A | 9/2005 |

OTHER PUBLICATIONS

Ryoji Kataoka et al., "Featured Article 2, Content Distribution Base Technologies, Media Asset Management technologies", Feb. 10, 2002, pp. 114-123, vol. 51, No. 2, 2002; The Telecommunications Association; Japan.

Kamikawa, et al. "High-dimensional Indexing Methods for Similarity-search of Image Contents" Transactions of Information Processing Society of Japan, vol. 42; No. SIG 1 (TOD8); pp. 140-147, Jan. 2001.

International Search Report for PCT/JP2006-325646 dated Feb. 27, 2007.

* cited by examiner

DIFFERENCE BETWEEN SEARCH RESULTS

FIG. 7
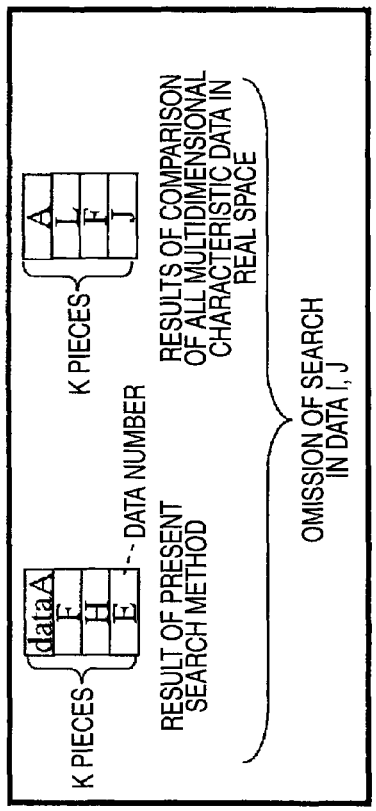
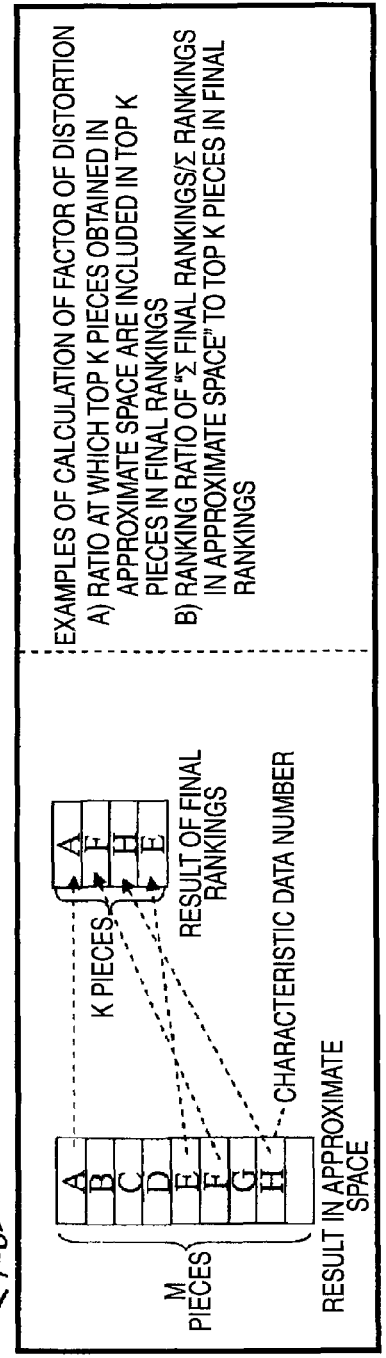

FIG. 8
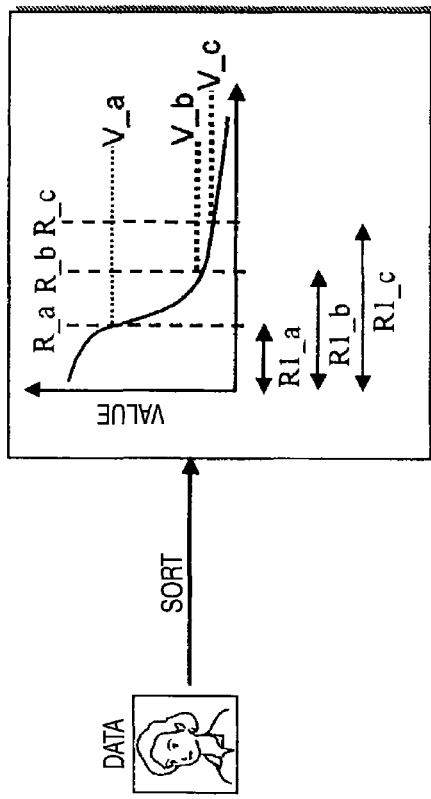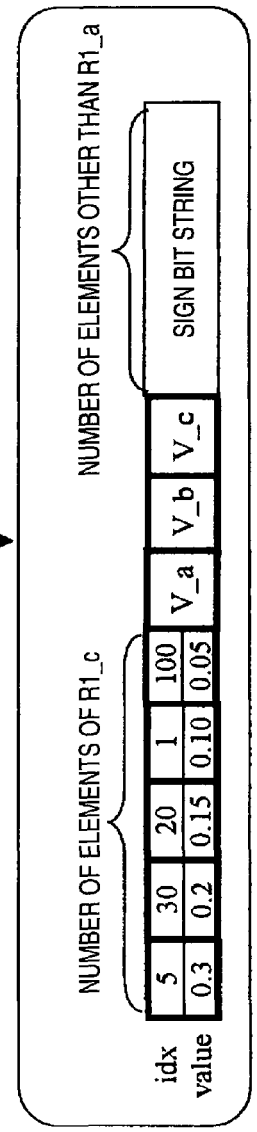

IMAGE SEARCH APPARATUS AND IMAGE SEARCH METHOD

This application is a continuation of U.S. patent application Ser. No. 12/064,928 filed Feb. 26, 2008 which is incorporated herein by reference in its entirety.

TECHNICAL FIELD

The present invention relates to an image search apparatus and image search method which can sort out a desired image at high speed from an image group of large capacity with using multidimensional feature data (a face, a color, and the like) extracted from an image.

BACKGROUND ART

Recently, with the increase of crimes typified by picking, robbery, arson, and the like, the popularity of a video monitoring system in which cameras, sensors, storage devices, and the like are disposed to prevent crimes is largely expanding. In accordance with adoption of IP to a monitoring camera and the increasing of the capacity of a storage device, the number of systems which perform wide-area monitoring of several hundred devices and long-time recording is increased. Under these circumstances, in order to reduce the task of an observer, it has been requested to develop a technique for efficiently sorting out a specific person such as a shoplifter, a lost child, or a person who has lost an article.

As a conventional technique for sorting out a specific person at high speed, there is a technique in which a group of multidimensional feature data (a face, a color, and the like) extracted from an image is previously clustered in ascending order of distance to be formed as a tree structure, and, in a searching process, only a subtree which is closest to the person to be searched is subjected to the searching process. Patent Reference 1 discloses a method in which projection is performed in a model space that is prepared by a statistical technique, and multidimensional feature data that are highly accurate, and that have a reduced number of dimensions are produced, thereby performing a high-speed search.

Patent Reference 1: JP-A-2002-183205

DISCLOSURE OF THE INVENTION

Problems that the Invention is to Solve

In the conventional tree-structure method, when the number of multidimensional feature data is large, however, the number of the adjacent spaces is exponentially increased, and it requires an enormous amount of time to cluster (register) the multidimensional feature data. In the searching process, furthermore, the neighbor search including adjacent spaces is performed, and therefore an enormous amount of time is required in the same manner as the registration.

In the technique disclosed in Patent Reference 1, there is a limit to the dimension reduction due to projection. As a countermeasure against this, also a method in which a similarity calculation is performed with using only high-importance portions such as the eyes/nose/mouth is described. However, portions where personal features appear are variously different. There is a limit to reduce the dimensions while maintaining the accuracy.

The invention has been conducted in view of the above-discussed conventional circumstances. It is an object of the invention to provide an image search apparatus and image search method in which, even when a large amount of multidimensional feature data such as the face/color exists in high dimensions, an image desired by the user can be searched efficiently and adequately.

Means for Solving the Problems

The image search apparatus of the invention comprises: dimension reducing means for reducing dimensions of multidimensional feature data extracted from an image, to produce approximate data; approximate-data storing means for storing the approximate data produced by the dimension reducing means with corresponding to the multidimensional feature data before the dimension reduction; search request receiving means for receiving at least an identifier which identifies multidimensional feature data of a person to be searched, as a search key; approximate-space searching means for calculating distances between approximate data corresponding to the search key received by the search request receiving means, and plural approximate data stored in the approximate-data storing means, based on search conditions, and for arranging the distances in order of similarity; and real-space final ranking means for again performing a distance calculation with using the multidimensional feature data before the dimension reduction, on a group of results in which the similarity obtained by the approximate-space searching means is high, for determining final rankings, and for outputting the final rankings as a search result.

According to the configuration, after search results are refined to some extent in an approximate space where the number of dimensions is suppressed, a final refinement can be performed in a real space, and therefore, even when the number of dimensions is increased, an image desired by the user can be efficiently searched. Since the search results are output in order of similarity, the searching process can be performed more efficiently.

The image search apparatus of the invention is characterized in that the dimension reducing means rearranges elements constituting the multidimensional feature data in descending order of an absolute value, and produces "element numbers, values" of a top N pieces (N: natural number) thereof as the approximate data. The image search apparatus of the invention is characterized in that, from a result of a wavelet transform of input multidimensional feature data, the dimension reducing means produces values of top N pieces of high-frequency components or low-frequency components, as the approximate data. The image search apparatus of the invention is characterized in that multidimensional feature data other than the top N pieces of data obtained by the dimension reducing means are produced as (typical values, sign bits), and managed as the approximate data.

According to the configuration, the dimensions can be reduced so that a portion which highly expresses a feature of a person strongly exerts an influence. Therefore, the omission of search in a process of refining the search result in an approximate space can be reduced.

The image search apparatus of the invention is characterized in that the real-space final ranking means performs a final ranking process on top M pieces (M: natural number) in which the similarity obtained by the approximate-space searching means is high, and outputs top K pieces (K<M) as the search result.

According to the configuration, the omission of search in a process of refining the search result in an approximate space can be suppressed.

The image search apparatus of the invention is characterized in that the real-space final ranking means performs a distance recalculation with using the multidimensional feature data before the dimension reduction, in descending order of elements in which the similarity obtained by the approximate-space searching means is high (i.e., in ascending order of the approximate distance), completes the process at a timing when top K pieces of actual distances which are obtained by the recalculation, and in which the similarity is high are smaller than an approximate distance of all data that are not subjected to the distance recalculation, and outputs the top K pieces of distances as the search result.

According to the configuration, it is possible to obtain the same result as the case where the distance calculation is performed with using all dimensions, and therefore the omission of search in a process of refining the search result in an approximate space can be made zero.

The image search apparatus of the invention is characterized in that the real-space final ranking means outputs "factor of distortion due to dimension reduction" indicating a degree at which a result obtained by the approximate-space searching means is changed by the final ranking process, as a result.

According to the configuration, it is possible to know the degree at which an omission of search occurs in the process of refining the search result in an approximate space, and hence it is possible to re-search an image efficiently.

The image search apparatus of the invention is characterized in that the apparatus further comprises re-search condition designating means for designating "number of dimensions to be used" and "piece number of results to be refined" as search conditions to be used by the approximate-space searching means.

According to the configuration, even when an omission of search occurs in the process of refining the search result in an approximate space, the user can easily perform the refining process due to re-searching. When it is configured so that re-search condition designating means refers to "factor of distortion due to dimension reduction" output by the real-space final ranking means to automatically re-designate the search conditions, an image can be searched more efficiently.

The image search apparatus of the invention is characterized in that the apparatus further comprises correctness/incorrectness designating means for designating correctness or incorrectness of the search result output by the real-space final ranking means. The image search apparatus of the invention is characterized in that the approximate-space searching means sets element numbers of approximate data which are designated as correct by the correctness/incorrectness designating means, as "correct element number group", sets element numbers of approximate data which are designated as incorrect, as "incorrect element number group", and, in the distance calculating process using approximate data, increases weightings of element numbers included in "correct element number group", and decreases weightings of element numbers included in "incorrect element number group".

According to the configuration, even when many omissions of search occur in the process of refining the search result in an approximate space, the user can easily perform the refining operation due to re-searching.

The image search method of the invention includes: approximate-space searching step of, with using approximate data produced by reducing dimensions of multidimensional feature data extracted from an image, arranging image groups stored in image storing means in order of similarity with an image to be searched; and real-space final ranking step of performing a distance re-calculation with using the multidimensional feature data before the dimension reduction, on a group of results in which the similarity obtained in the approximate-space searching step is high, and of determining final rankings.

Effects of the Invention

According to the invention, after search results are refined to some extent in an approximate space where the number of dimensions is suppressed, a final refinement can be performed in a real space. Even when the number of dimensions is increased, therefore, an image desired by the user can be efficiently searched.

BRIEF DESCRIPTION OF THE DRAWINGS

FIG. 7 is a diagram relating to a factor of distortion calculation in the image search apparatus of the second embodiment of the invention.

FIG. 8 is a diagram relating to a data structure managed in the image search apparatus of the second embodiment of the invention.

Figure 1:
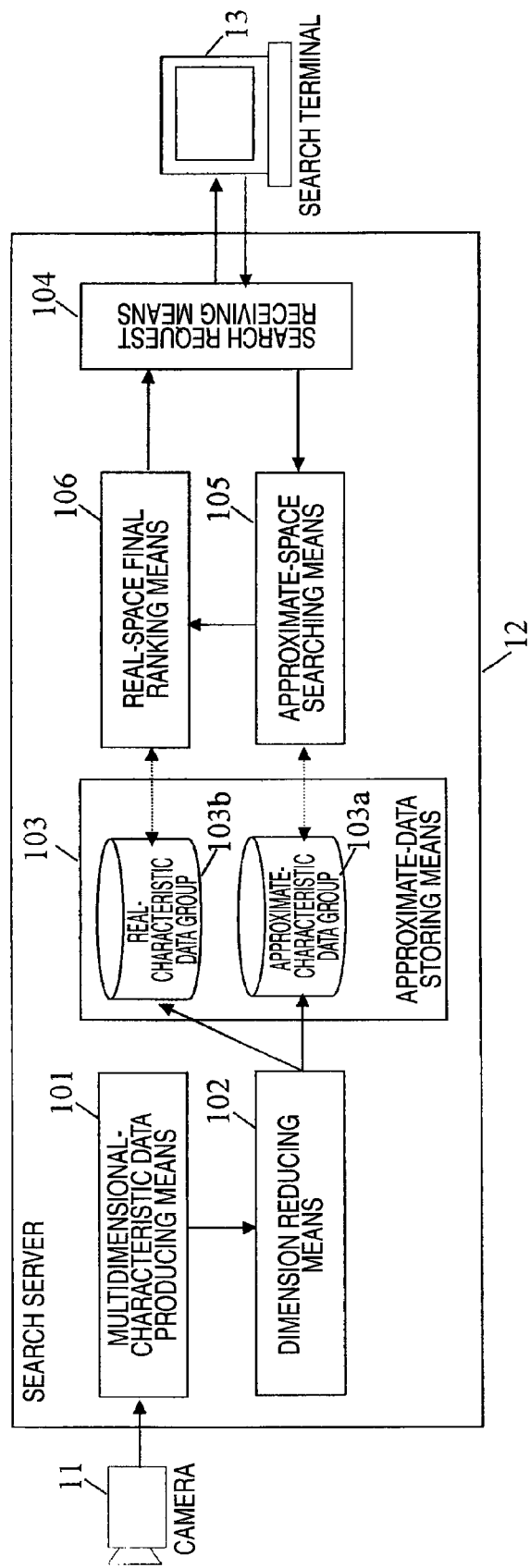
FIG. 1 is a block diagram of an image search apparatus of a first embodiment of the invention.

DESCRIPTION OF REFERENCE NUMERALS AND SIGNS 11 camera
12 search server
13 search terminal
101 multidimensional-feature data producing means
102 dimension reducing means
103 approximate-data storing means
103a approximate-feature data group
103b real-feature data group
104 search request receiving means
105 approximate-space searching means
106 real-space final ranking means

BEST MODE FOR CARRYING OUT THE INVENTION

Hereinafter, embodiments of the invention will be described with reference to the drawings.

Embodiment 1

FIG. 1 is a diagram of an image search apparatus of Embodiment 1 of the invention. In FIG. 1, 11 denotes a camera which takes an image of a person, 12 denotes a search server which searches an image including a person corresponding to designated search conditions, and 13 denotes a search terminal through which search conditions are designated to cause a searching process to be executed. The reference numeral 101 denotes multidimensional-feature data producing means for extracting multidimensional feature data for identifying a person, such as face/color/shape, from an image taken by the camera 11, 102 denotes dimension reducing means for reducing the dimensions of the multidimensional feature data extracted by the multidimensional-feature data producing means 101, thereby producing approximate data, 103 denotes approximate-data storing means for making the approximate data produced by the dimension reducing means 102 correspondent to the multidimensional feature data before the dimension reduction, and for storing the data as an approximate-feature data group 103a and a real-feature data group 103b, 104 denotes search request receiving means for receiving at least an identifier which identifies multidimensional feature data of a person to be searched, as a search key, 105 denotes approximate-space searching means for, on the basis of the search conditions designated by the search terminal 13, calculating distances between approximate data corresponding to the search key received by the search request receiving means 104, and plural approximate data stored in the approximate-data storing means 103, and for arranging the distances in order of distance of the calculation result, i.e., in order of similarity, and 106 denotes real-space final ranking means for again performing a distance calculation with using the multidimensional feature data before the dimension reduction, on a group of results in which the similarity obtained by the approximate-space searching means 105 is high, and for determining final rankings. The final rankings determined by the real-space final ranking means 106 are output as a search result.

The person feature data extracted by the multidimensional-feature data producing means 101 are image data of a mobile body segmented from an image, or information identifying a mobile body on the basis of a shape, a color, a size, a motion, and the like, or information which identifies the shapes and positions of the eyes, nose, and mouth of the face, and the like. The method of extracting and classifying such feature information is well known. For example, the method is strictly described in "GAZO NO SHORI TO NINSHIKI" (AGUI Takeshi and NAGAO Tomoharu, published by SHOKODO). The person feature data of a face/cloth color, and the like which are produced with using these existing techniques are configured by plural elements (referred to as dimensions) for identifying a person. For example, face feature data are configured by an element group for grasping the whole facial expression, and that for grasping shapes of specific parts such as eyes/nose/mouth, and the like, in total: several hundred to several thousand dimensions.

Figure 2:
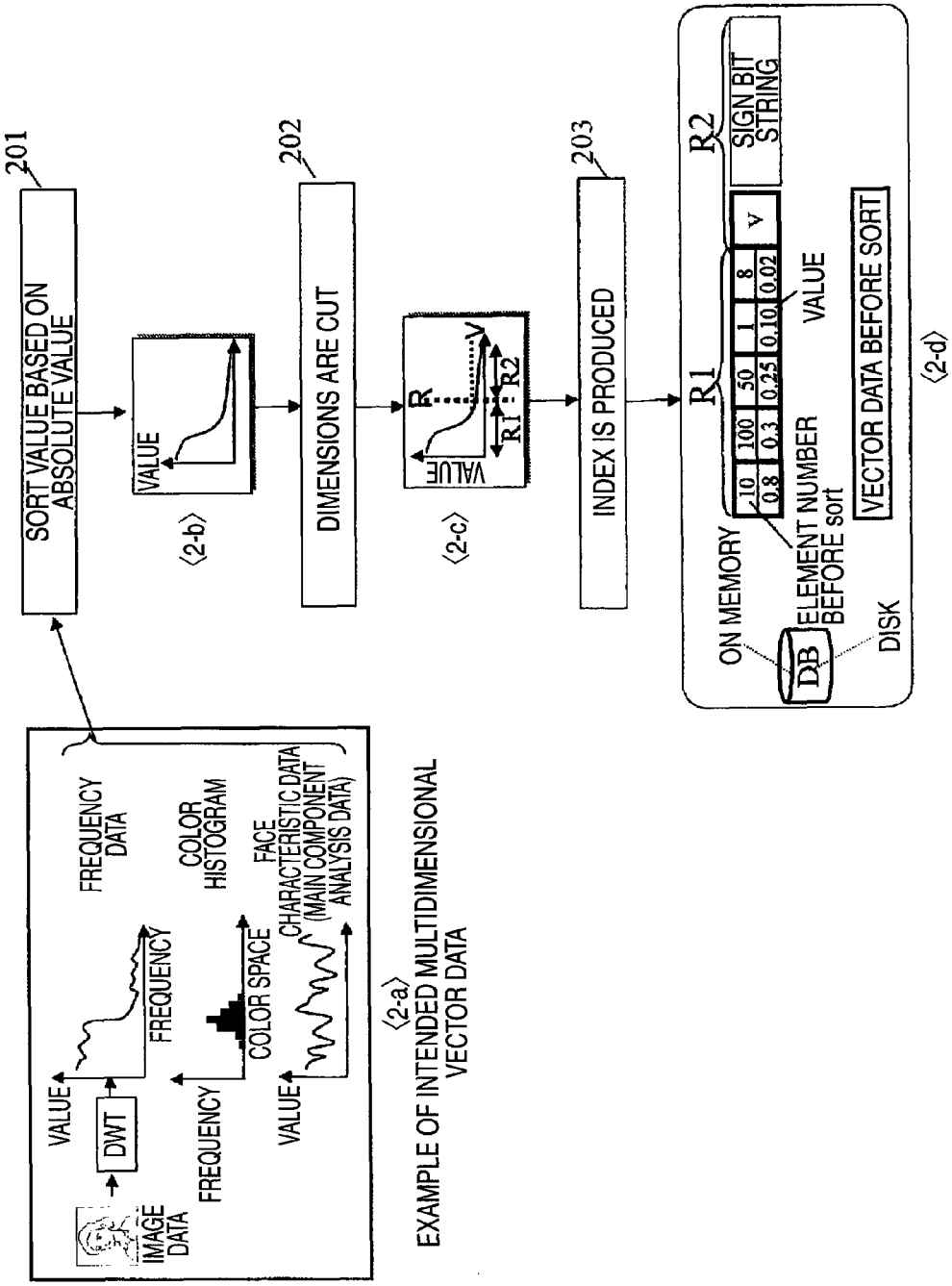
FIG. 2 is a flow chart relating to a data registering operation in the image search apparatus of the first embodiment of the invention.

FIG. 2 shows the process procedure of the dimension reducing means 102. Hereinafter, its operation will be described.

<Step 201> With respect to input multidimensional feature data (a series of [element number, value]), all values are set to absolute values, and sorted in descending order of value. As shown in 2-a, the input multidimensional feature data are face feature data having main components in the unit of the whole face/component, data indicating the color distribution of the cloth of a person in the form of a color space histogram such as RGB/HSV, and data which are obtained by segmenting a region where an image of a person is taken, and converting the region into a frequency. Sets of [element number, value] of elements of the abscissa are given as an input of the multidimensional feature data in step 201. After the sorting, as shown in 2-b, the data are arranged in descending order of absolute value, and elements of the abscissa are produced as [element number before sorting, value].

<Step 202> The multidimensional feature data are separated (the dimensions are cut) by a designated dimension (R). After the separation, elements within the designated dimension R (those having a large absolute value) are output as a series of [element number before sorting, value] as R1 data, and the portion larger than the designated dimension R is produced as [string of sign bits within typical values V, R2] as R2 data (2-c). As the typical value V of the R2 data, the average value in absolute values of the R2 data, or the maximum value in absolute values of the R2 data is used. The string of sign bits is produced as a bit string in which the signs of the elements of R2 are known in the form that, when the value of an N-th element of R2 is positive, the bit value=1, and, when the value is negative, the bit value=0.

<Step 203> The R1 and R2 data which are produced in step 202 are stored into the approximate-feature data group 103a of the approximate-data storing means 103, and the vector data before sorting which are produced in step 201 are stored into the real-feature data group 103b, thereby producing an index. The approximate-feature data group 103a is a data group in which the dimensions are reduced, and hence may be placed on a memory which is accessible at high speed.

Figure 3:
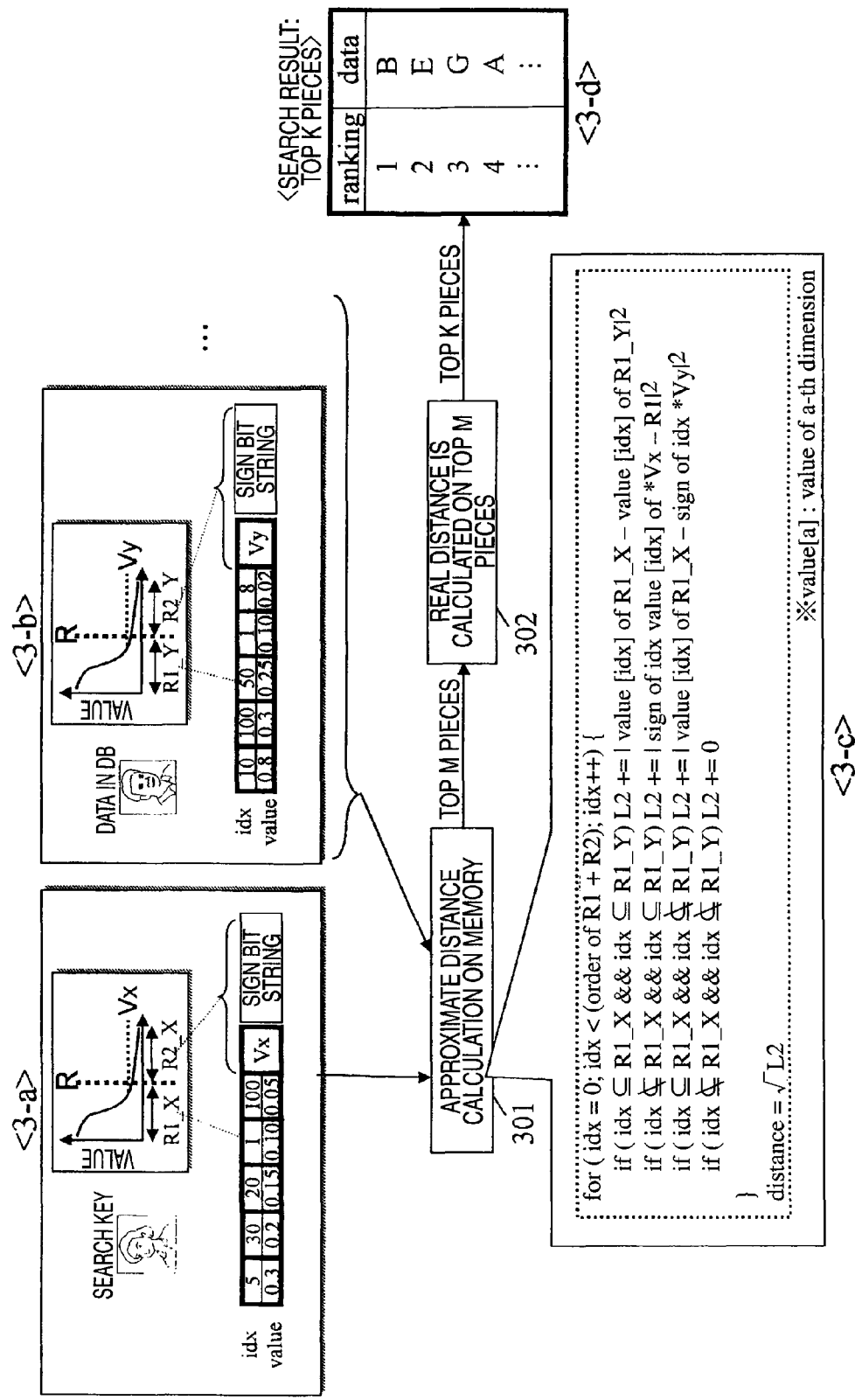
FIG. 3 is a flow chart relating to a searching operation in the image search apparatus of the first embodiment of the invention.

FIG. 3 shows the process procedures of the approximate-space searching means 105 and the real-space final ranking means 106. Hereinafter, their operation will be described.

<Step 301> Approximate distances between approximate data (3-a) corresponding to the search key received by the search request receiving means 104, and plural approximate data (3-b) stored in the approximate-data storing means 103 are calculated. The plural approximate data stored in the approximate-data storing means 103 are arranged in ascending order of approximate distance. In the approximate-distance calculation, as shown in 3-c, the following process is performed on all the dimensions before sorting:

1) when the dimensions are included in R1 of (3-a) and (3-b), the distance calculation is performed with using values in R1; and 2) when the dimensions are included in one of R2 of (3-a) and (3-b), the approximate value of a dimension included in R2 is calculated from the typical value (V) and sign bit of R2, and the distance calculation is performed with using the approximate value.

<Step 302> On top M pieces which are arranged in ascending order of distance in step 301, real distances with respect to the search key received by the search request receiving means 104 are calculated. As shown in 3-d, top K pieces in ascending order of real distance are extracted and returned as results. The real distances are calculated from the vector data before sorting which are stored in the real-feature data group 103b.

Figure 4:
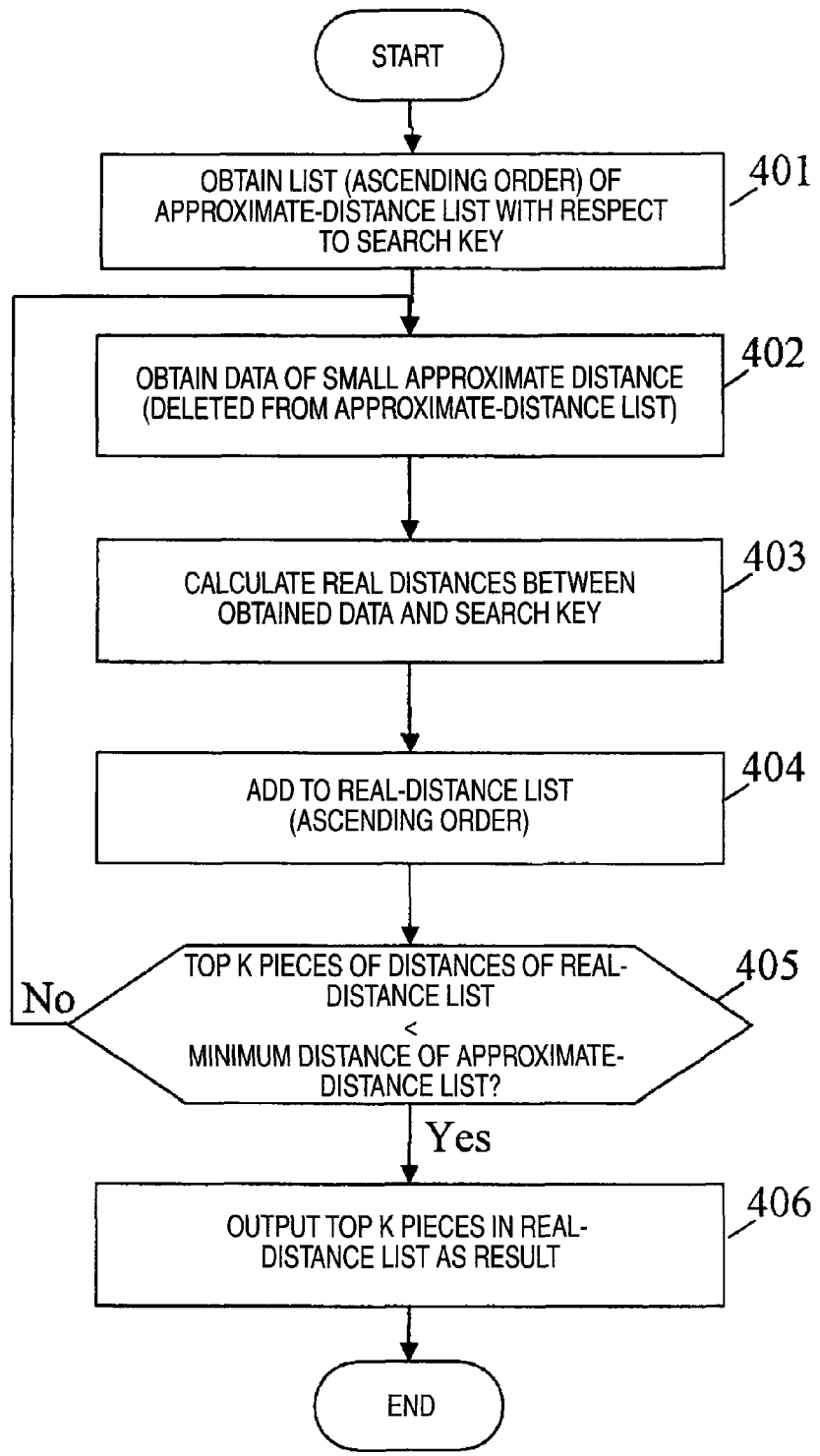
FIG. 4 is a flow chart relating to a searching operation of eliminating omission of search in the image search apparatus of the first embodiment of the invention.

In the process of FIG. 3, a final ranking process is performed in a real space on the top M pieces which are arranged in ascending order of approximate distance. There is a possibility that the omission of search occurs at a timing when the data are refined to the top M pieces. FIG. 4 shows the process procedure of real-space final ranking means 108 for causing the omission of search in the process of refining in an approximate space to be zero. Hereinafter, its operation will be described.

<Step 401> A list of the approximate distances with respect to the search key which are produced in the approximate-space searching means 105 is obtained. It is assumed that, in the list, the approximate distances are stored in the ascending order.

<Step 402> Data of a small approximate distance are obtained from the approximate-distance list. At the timing of obtaining, the corresponding data are deleted from the approximate-distance list.

<Step 403> Real distances between the data obtained in step 402 and the data corresponding to the search key are calculated.

<Step 404> The data obtained in step 402 are added to a real-distance list. In the list, the real distances are stored in the ascending order.

<Step 405> It is determined whether all of the top K pieces of distances of the real-distance list are smaller than the minimum distance of the approximate-distance list or not. If Yes, the process is transferred to step 406, and, if No, the process is transferred to step 402.

<Step 406> The top K pieces of distances of the real-distance list are output as a search result of the real-space final ranking means 106.

Figure 5:
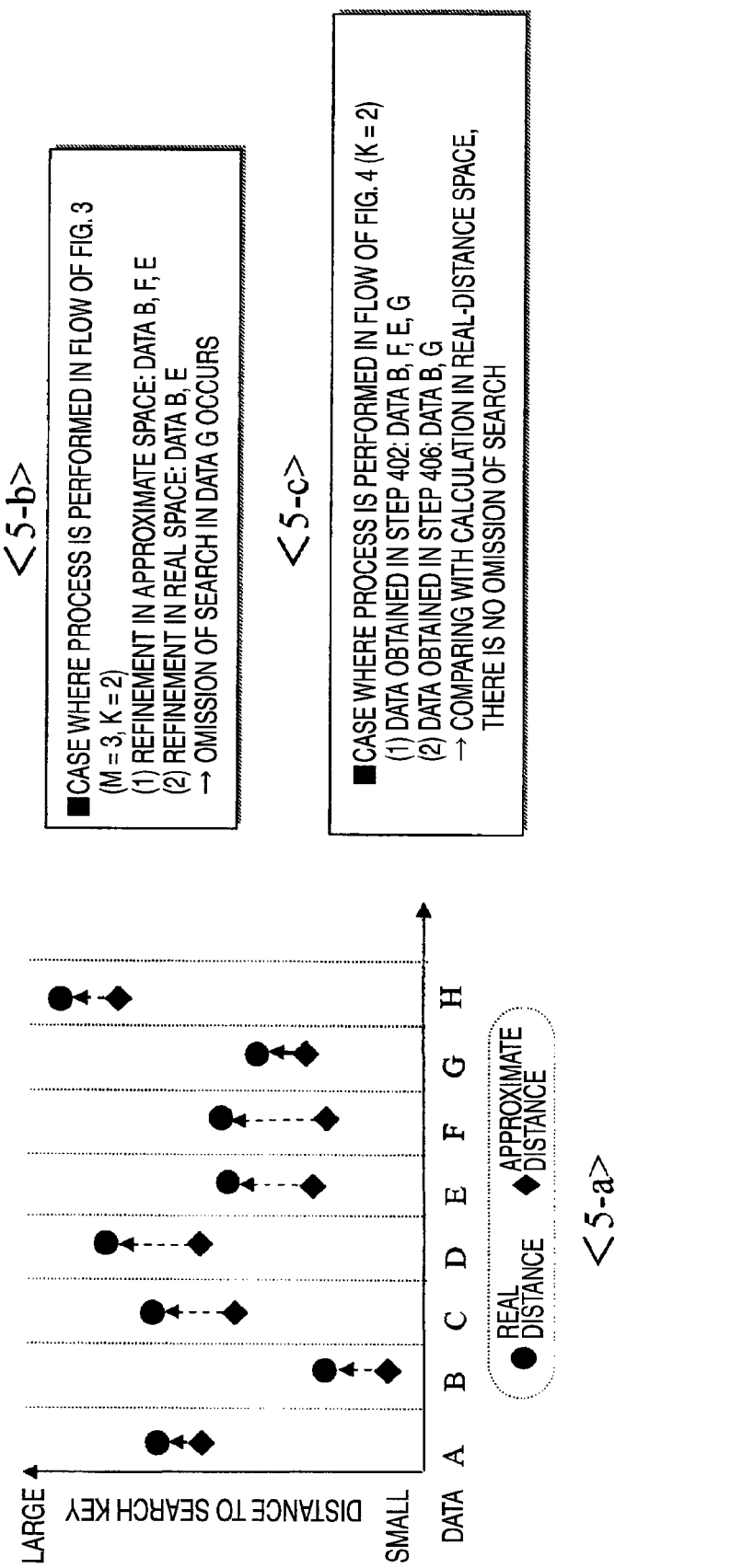
FIG. 5 is a diagram relating to a difference between searching processes of two kinds in the image search apparatus of the first embodiment of the invention.

With reference to FIG. 5, the difference in search result due to the process procedures of FIGS. 3 and 4 will be described. In 5-$a$, examples of "approximate distance and real distance" between the search key and data A to H are shown. When a searching process is performed on 5-$a$ in the flow of FIG. 3, the omission of search occurs in data G as shown in 5-$b$. By contrast, when a searching process is performed in the flow of FIG. 4, the omission of search does not occur in data G as shown in 5-$c$. The decision on which of the searching processes of FIGS. 3 and 4 is employed depends on the relationship between the approximate distance and the real distance. In the case where "approximate distance≈real distance" is established in all data, for example, there is no possibility that the search rankings are largely changed by approximation, and hence FIG. 4 in which a high-speed process is enabled while the omission of search is prevented from occurring is appropriate. By contrast, in the case where "approximate distance<<real distance" is established, searching on all data eventually occurs in the process of FIG. 4 so that the process is slow, and hence the process of FIG. 3 in which a high-speed search is enabled while the omission of search is suppressed to some extent is appropriate.

As described above, after search results are refined to some extent in an approximate space where the number of dimensions is suppressed, a final refinement can be performed in a real space. Even when the number of dimensions is increased, therefore, an image desired by the user can be efficiently searched while suppressing the calculation amount. For each image, dimensions are reduced while separating into components which highly express a feature of a person, and average components. Even in the case where an image of a person in which a feature largely appears in a component that has been assumed not to be high is registered, therefore, it is possible to search the corresponding person image flexibly and adequately as compared with the case where dimensions are reduced with using only components in which the importance is previously assumed to be high, such as the eyes/nose/mouth. When the searching process such as shown in FIG. 4 is introduced, furthermore, the omission of search in the process of refining the search result in an approximate space can be made zero.

As the method of reducing dimensions, the method in which separation into components highly expressing a feature of a person and average components is performed by rearranging component values has been described. Alternatively, by using a wavelet transform typified by Haar and the like, the R2 data may be produced from "average components" corresponding to the low frequency, and the R1 data may be produced from "difference components with respect to the average" corresponding to the high frequency. In this case, element numbers constituting R1/R2 data do not depend on the input multidimensional feature data, and are fixed. Therefore, it is possible to attain an effect that the calculation amount of the approximate-space searching means 105 can be reduced. The case where the differences among the multidimensional feature data strongly appear in average components can be coped with by a countermeasure that "average components" corresponding to the low frequency after the above-mentioned wavelet transform are changed to the R1 data, and "difference components with respect to the average" corresponding to the high frequency are changed to the R2 data.

Embodiment 2

In Embodiment 2, an image search apparatus in which, even when many omissions of search occur in the process of refining the search result in an approximate space, the user can easily perform the refining operation due to re-searching will be described.

The configuration of Embodiment 2 of the invention is substantially identical with Embodiment 1. Therefore, hereinafter, only the process procedure of the refining operation due to re-searching which is added will be described, and the others will be omitted.

Figure 6:
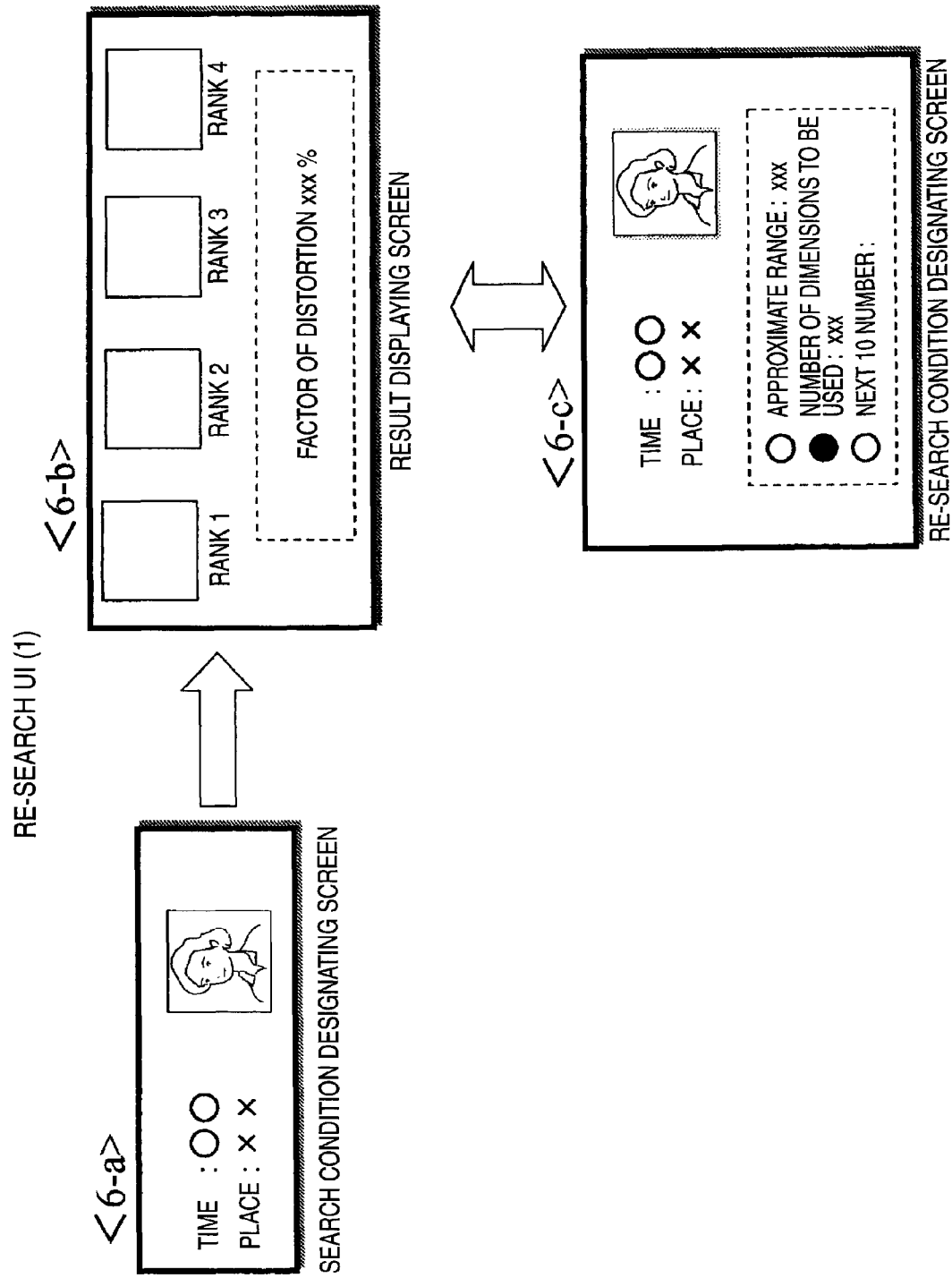
FIG. 6 is a flow chart relating to a re-searching operation in an image search apparatus of a second embodiment of the invention.

FIG. 6 shows an example in which "factor of distortion due to dimension reduction" indicating a degree at which a search result obtained by the approximate-space searching means 105 is changed by the final ranking process in the real-space final ranking means 106 is displayed as a result, and, while referring to "factor of distortion due to dimension reduction", the user sets "number of dimensions to be used" and "piece number of results to be refined" as re-search conditions, in the approximate-space searching means 105. In the figure, 6-$a$ is an initial search condition designating screen in which a search key of a person to be searched and a search range of time/place are initially designated, 6-$b$ is a search result displaying screen on which a search result is displayed together with "factor of distortion due to dimension reduction", and 6-$c$ is a re-search condition designating screen in which, as the next search conditions, the user designates one of three re-search methods [1) adjustment of the used dimension number (number of dimensions to be used), 2) adjustment of the approximate range (piece number of results to be refined), and 3) the above-mentioned 1) and 2) are not performed, and next K pieces are output]. The operations of 6-$b$ and 6-$c$ are repeatedly performed.

Referring to FIG. 7, an example of a calculation of "factor of distortion due to dimension reduction" will be described. In the figure, 7-$a$ shows an example of the omission of search (data L, G) which occurs in the case where a search is performed in the configuration such as shown in FIGS. 1, and 7-$b$ shows a difference between search results which are obtained in the approximate-space searching means 105 and the real-space final ranking means 106 when the omission of search occurs. In 7-$b$, when the value of M in the top M pieces which is a threshold of refinement in an approximate space is made large, the possibility of the omission of search is reduced. However, the degree at which the value of M is to be increased by the user cannot be determined. Consequently, when a) a ratio at which the top K pieces obtained in an approximate space are included in the top K pieces in the final rankings, or b) a ranking ratio of "total sum of final rankings (i.e., K*(K+1)/2)/total sum of rankings in an approximate space" to the top K pieces of data in the final rankings is used as "factor of distortion due to dimension reduction", it is possible to inform the user of the degree at which distortion due to dimension reduction occurs. As the value of a) or b) is smaller, the degree of distortion is larger.

Next, the operation in which the re-search conditions are designated by the user with reference to "factor of distortion due to dimension reduction" will be described in detail. As shown in 6-*c*, in designation of the re-search conditions, there are three patterns of 1) adjustment of the used dimension number, 2) adjustment of the approximate range, and 3) the next K pieces are output.

The used dimension number of 1) means the number of elements of the R1 data used in the approximate-space searching means 105. When the number of elements of the R1 data is increased, "factor of distortion due to dimension reduction" can be reduced. In order that, when the used dimension number is adjusted, the approximate-space searching means 105 is enabled to change the element number of the R1 data and perform a re-searching process, a data structure corresponding to plural cut dimensions (R_a, R_b, R_c) such as shown in FIG. 8 is previously produced. The data structure is not required to be produced for each of the plural cut dimensions. As shown in 8-*b*, it can be coped with by preparing the data structure so as to correspond to the cut dimension (R_c) having a large element number of the R1 data.

The adjustment of the approximate range of 2) is performed in order to adjust the range to be refined in an approximate space (the value of M in the top M pieces). Even when "factor of distortion due to dimension reduction" is large, the omission of search can be prevented from occurring by increasing the value of M.

The next K pieces of 3) are used when the user determines that "factor of distortion due to dimension reduction is small" or "factor of distortion due to dimension reduction is large but the adjustment 1) or 2) is difficult".

As described above, the user refers to "factor of distortion due to dimension reduction", and adjusts "number of dimensions to be used" and "piece number of results to be refined" by means the approximate-space searching means, whereby a re-searching operation in which the omission of search in a process of refining the search result in an approximate space is suppressed can be realized. Alternatively, a configuration where re-search condition designating means refers to "factor of distortion due to dimension reduction" output by the real-space final ranking means to automatically re-designate the search conditions may be employed. According to the configuration, an image can be searched more efficiently.

Embodiment 3

In Embodiment 3, an image search apparatus which is different from Embodiment 2, and in which, even when many omissions of search occur in the process of refining the search result in an approximate space, the user can easily perform the refining operation due to re-searching will be described.

The configuration of Embodiment 3 of the invention is substantially identical with Embodiment 1. Therefore, hereinafter, only the process procedure of the refining operation due to re-searching which is added will be described, and the others will be omitted.

Figure 9:
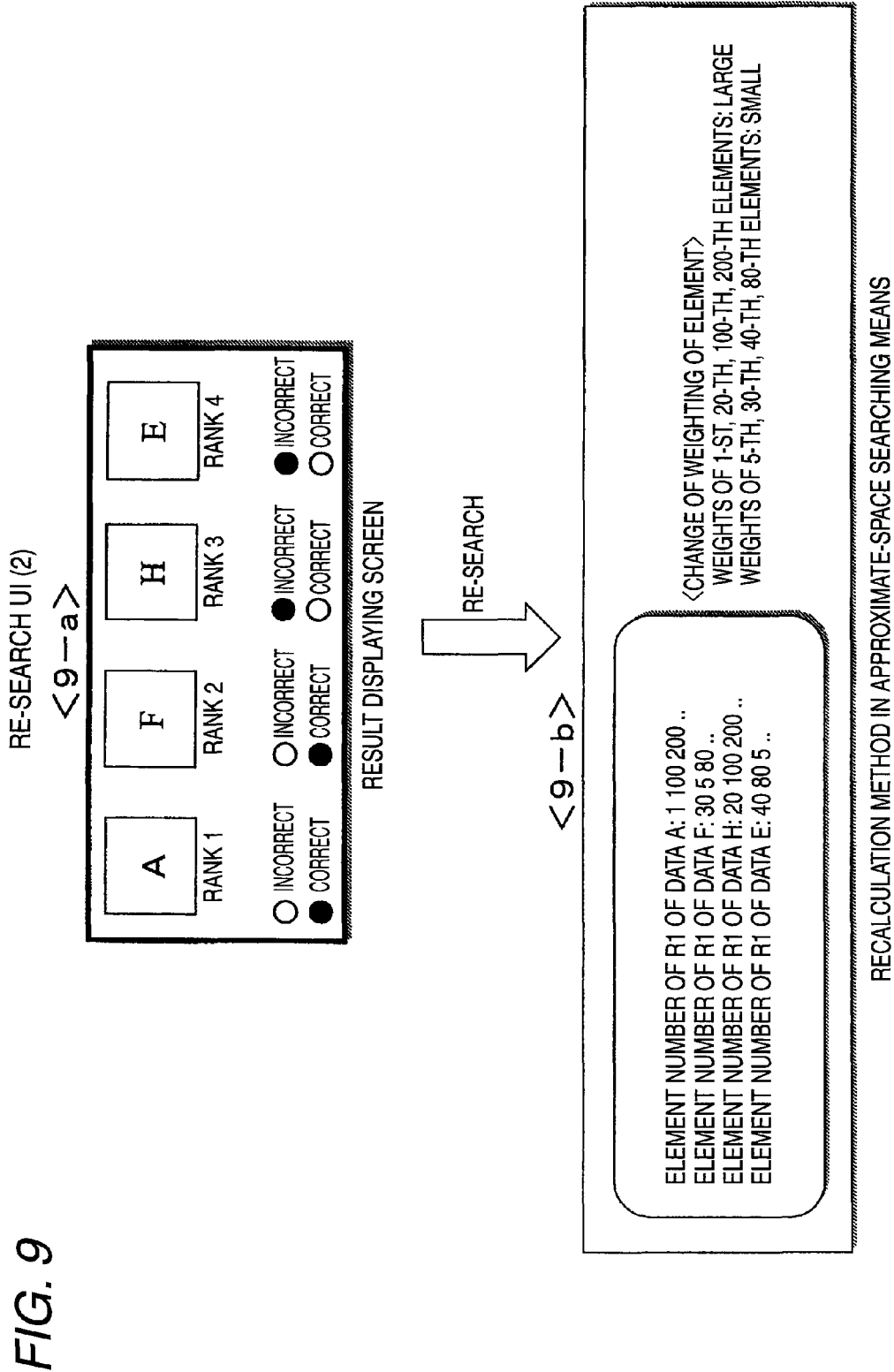
FIG. 9 is a flow chart (No. 1) relating to a re-searching operation in an image search apparatus of a third embodiment of the invention.

FIG. 9 shows an example in which, when the user designates correctness or incorrectness of the search result, the approximate-space searching means 105 increases weightings of element numbers used in approximate data designated as correct, and decreases weightings of element numbers used in approximate data designated as incorrect, and then the distance calculation in an approximate space is again performed. As shown in 9-*b*, element numbers which highly express a feature of a person are different for each of search results. From results which are designated as correct/incorrect by the user, therefore, element numbers from which correctness is to be derived, and those from which incorrectness is to be removed are extracted and weighted, whereby a re-searching process in which the omission of search is suppressed can be realized. The weighting means an operation of, in the distance calculation of each dimension in 3-*c* of FIG. 3, providing a result of the distance calculation with a weighting factor.

Figure 10:
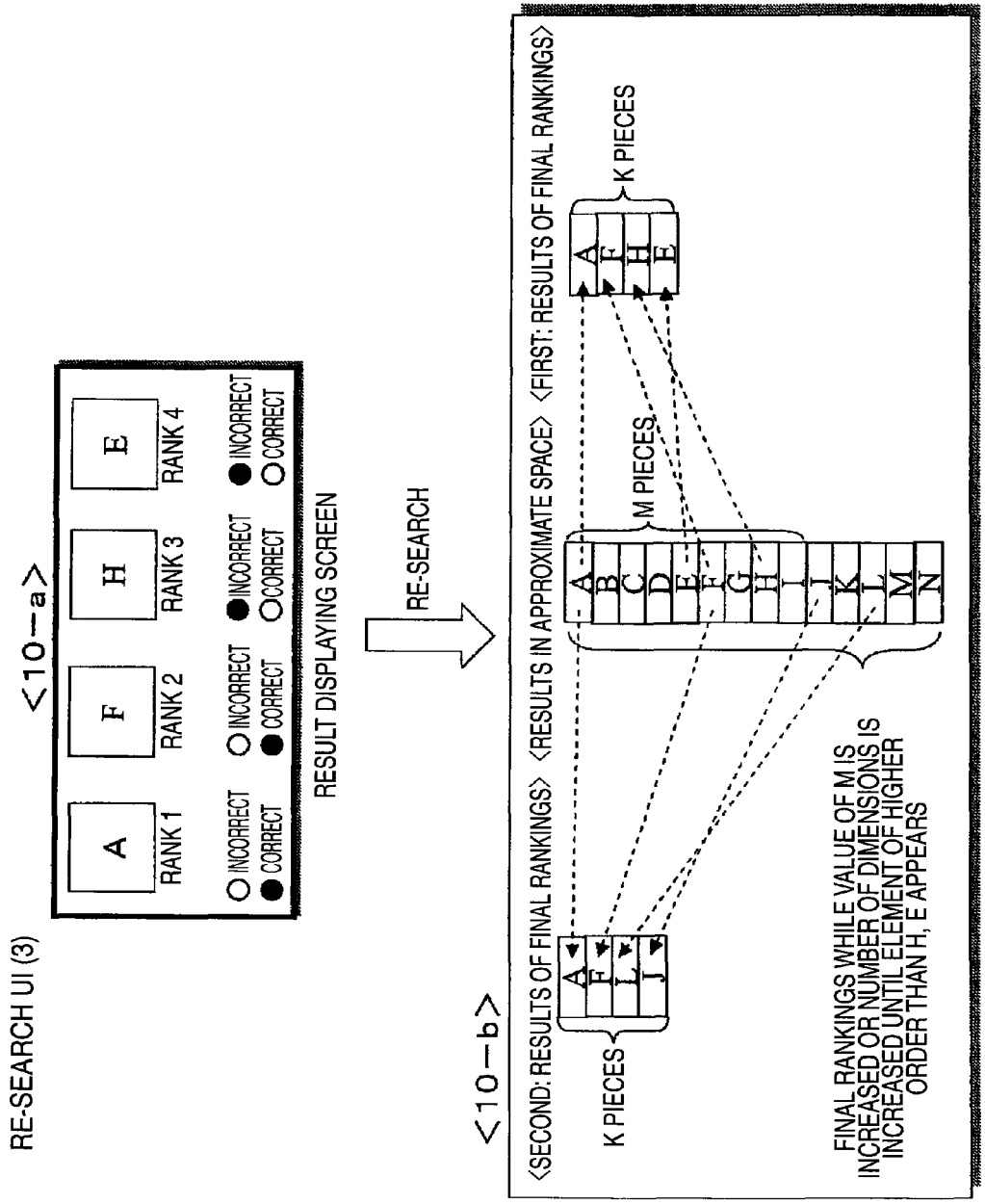
FIG. 10 is a flow chart (No. 2) relating to re-searching operation 1 in the image search apparatus of the third embodiment of the invention.

FIG. 10 shows an example in which, when the user designates a search result as incorrect, "number of dimensions to be used" and "piece number of results to be refined" are automatically adjusted in the approximate-space searching means 105 so that the data designated as incorrect are not output in the real-space final ranking means 106. In 10-*b*, when the user designates "data H/E=incorrect", the process is performed while the value of M in the top M pieces which is a threshold of refinement in an approximate space is made large, or the number of dimensions to be used is increased, until an element which is smaller in distance than the data H/E.

As described above, the user designates correctness/incorrectness for each image, and approximate-distance calculation parameters (the weight of the element number, the number of dimensions to be used, and the approximate range) in the re-searching process are automatically adjusted, whereby a re-searching operation in which the omission of search in a process of refining the search result in an approximate space is suppressed can be realized.

As described above, the image search apparatuses and image search methods of the embodiments of the invention have an effect that, after search results are refined to some extent in an approximate space where the number of dimensions is suppressed, a final refinement is performed in a real space, whereby, even when the number of dimensions is increased, an image desired by the user can be searched efficiently and adequately. The apparatus and method can be applied also to uses of view, search, and edition on contents (still image or motion picture) obtained by a personally in travel, athletic meet, or the like, in addition to a monitoring use in which all behaviors of as a shoplifter, a lost child, or a person who has lost an article are grasped with using plural cameras.

While the invention has been described in detail with reference to specific embodiments, it will be obvious to those skilled in the art that various changes or modifications may be made without departing from the sprit and scope of the invention.

The present application is based on Japanese Patent Application (No. 2005-370613) filed Dec. 22, 2005, and its disclosure is incorporated herein by reference.

INDUSTRIAL APPLICABILITY

The invention has an effect that, after search results are refined to some extent in an approximate space where the number of dimensions is suppressed, a final refinement is performed in a real space, and therefore, even when the number of dimensions is increased, an image desired by the user can be searched efficiently. The invention is useful in an image search apparatus, image search method, or the like which can sort out a desired image at high speed from an image group of large capacity with using multidimensional feature data (a face, a color, and the like) extracted from an image.

The invention claimed is:

1. An image search apparatus comprising:
a search server, the search server comprising:
an image storing unit storing a plurality of images;
an approximate-data storing unit including a memory storing approximate data of the image, in association with the image; and
a processor comprising:
an approximate-space searching unit that searches approximate data of a search key from the approximate data stored in the approximate-data storing unit and which outputs M pieces (M: natural number) of approximate data similar to the approximate data of the search key; and
a calculating unit that calculates similarity between the search key and M pieces of images stored in the image storing unit corresponding to the M pieces of approximate data, and that outputs top K (K<M) pieces of distances as a search result, wherein the calculating unit comprises a real-space final ranking unit that performs a final ranking process on top M pieces in which the similarity obtained by the approximate-space searching unit is high and of which, rankings determined by respective approximate distances are high, and that outputs, as the search result, top K pieces (K<M) of which rankings determined by respective real distances are high,
wherein a value of M is changed according to a factor of distortion due to approximation of the image, and wherein the factor of distortion due to approximation of the image indicates a degree at which a result obtained by the approximate-space searching unit is changed by the final ranking process.

2. The image search apparatus according to claim 1, further comprising an approximate-data producing unit that rearranges elements constituting multidimensional feature data in descending order of an absolute value, and that produces "element numbers, values" of a top N pieces (N: natural number) thereof as the approximate data.

3. The image search apparatus according to claim 2, wherein, from a result of a wavelet transform of the image data, the approximate-data producing unit produces values of top N pieces of high-frequency components or low-frequency components, as the approximate data.

4. The image search apparatus according to claim 2, wherein approximate data other than the top N pieces of data obtained by the approximate-data producing unit are produced as (typical values, sign bits), and managed as the approximate data.

5. The image search apparatus according to claim 1, wherein the real-space final ranking unit outputs the factor of distortion.

6. The image search apparatus according to claim 5, further comprising a re-search condition designating unit that designates "number of dimensions to be used" and "piece number of results to be refined" as search conditions of the approximate-space searching unit.

7. The image search apparatus according to claim 1, further comprising a correctness/incorrectness designating unit that designates correctness or incorrectness of the search result output by the real-space final ranking unit.

8. The image search apparatus according to claim 7,
wherein the approximate-space searching unit sets, as "correct element number group", element numbers of approximate data designated as correct by the correctness/incorrectness designating unit, and sets, as "incorrect element number group", element numbers of approximate data designated as incorrect, and,
wherein in a distance calculating process using the approximate data, the approximate-space searching unit increases weightings of element numbers included in "correct element number group", and decreases weightings of element numbers included in "incorrect element number group".

9. The image search apparatus according to claim 7, wherein the approximate-space searching unit automatically adjusts "number of dimensions to be used" and "piece number of results to be refined" which are search conditions so that the approximate data designated as incorrect by the correctness/incorrectness designating unit are not output in the real-space final ranking unit.

10. An image search method comprising:
approximate-space searching step of using a plurality of pieces of approximate data produced by approximating a plurality of images, comparing the approximate data to approximate data corresponding to a search key, and outputting M pieces (M: natural number) of approximate data similar to the approximate data of the search key;
a calculating step of calculating similarity between the search key and the M pieces of images corresponding to the M pieces of the approximate data, and outputting the top K (K<M) pieces of distances as the search result;
a real-space final ranking step of performing a final ranking process on top M pieces in which the similarity obtained by the approximate-space searching step is high and of which, rankings determined by respective approximate distances are high, and outputting, as the search result, top K pieces (K<M) of which rankings determined by respective real distances are high;
determining a factor of distortion due to approximation of an image, wherein the factor of distortion due to approximation of the image indicates a degree at which a result obtained by the approximate-space searching step is changed by the final ranking process; and
changing a value of M according to the factor of distortion.

11. The image search method according to claim 10, further comprising an approximate-data producing step of rearranging elements constituting multidimensional feature data in descending order of an absolute value, and producing "element numbers, values" of a top N pieces (N: natural number) thereof as the approximate data.

12. The image search method according to claim 11, wherein, from a result of a wavelet transform of the image data, the approximate-data producing step produces values of top N pieces of high-frequency components or low-frequency components, as the approximate data.

13. The image search method according to claim 11, wherein approximate data other than the top N pieces of data obtained by the approximate-data producing step are produced as (typical values, sign bits), and managed as the approximate data.

14. The image search method according to claim 10, wherein in the real-space final ranking step, the factor of distortion is output as a result.

15. The image search method according to claim 14, further comprising a re-search condition designating step of designating "number of dimensions to be used" and "piece number of results to be refined" as search conditions to be used by the approximate-space searching step.

16. The image search method according to claim 10, further comprising a correctness/incorrectness designating step of designating correctness or incorrectness of the search result output by the real-space final ranking step.

17. The image search method according to claim 16, wherein in the approximate-space searching step, element numbers of approximate data designated as correct by the correctness/incorrectness designating step is set as "correct element number group", and element numbers of approximate data designated as incorrect is set as "incorrect element number group", and,
  wherein in a distance calculating process using the approximate data, weightings of element numbers included in "correct element number group" is increased, and weightings of element numbers included in "incorrect element number group" is decreased.

18. The image search method according to claim 16, wherein in the approximate-space searching step, "number of dimensions to be used" and "piece number of results to be refined" which are search conditions are automatically adjusted so that the approximate data designated as incorrect by the correctness/incorrectness designating step are not output in the real-space final ranking step.

19. The image search apparatus according to claim 1, wherein
  the approximate-space searching unit calculates the approximate distances, between the approximate data of the search key and the M pieces of approximate data, the calculating unit calculates the real distances, between the search key and M pieces of multidimensional feature data, wherein
    each of the M pieces of multidimensional feature data are obtained from a respective one of the M pieces of images, and
    each of the M pieces of approximate data are obtained by dimensionally reducing a respective one of the M pieces of multidimensional feature data.

20. The image search method according to claim 10, wherein
  in the approximate-space searching step, the approximate distances, between the approximate data of the search key and the M pieces of approximate data, are calculated,
  in the calculating step, the real distances, between the search key and M pieces of multidimensional feature data, are calculated, wherein
    each of the M pieces of multidimensional feature data are obtained from a respective one of the M pieces of images, and
    each of the M pieces of approximate data are obtained by dimensionally reducing a respective one of the M pieces of multidimensional feature data.

* * * * *